(12) United States Patent
Verma et al.

(10) Patent No.: US 6,507,860 B1
(45) Date of Patent: Jan. 14, 2003

(54) SYSTEM AND METHOD FOR RAM-PARTITIONING TO EXPLOIT PARALLELISM OF RADIX-2 ELEMENTS IN FPGAS

(75) Inventors: Hare K. Verma, Campbell, CA (US); Sudip K. Nag, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 296 days.

(21) Appl. No.: 09/670,495

(22) Filed: Sep. 26, 2000

Related U.S. Application Data (60) Division of application No. 09/034,739, filed on Mar. 4, 1998, now Pat. No. 6,167,416, which is a continuation-in-part of application No. 08/937,977, filed on Sep. 26, 1997, now Pat. No. 6,021,423.

(51) Int. Cl.[7] .............................................. G06F 15/00
(52) U.S. Cl. ....................................... 708/404
(58) Field of Search ................................ 708/400, 403, 708/404, 405, 406, 407, 408, 409

(56) References Cited

U.S. PATENT DOCUMENTS

| | | |
|---|---|---|
| 3,777,130 A | 12/1973 | Croisier et al. |
| 4,689,762 A | 8/1987 | Thibodeau, Jr. |
| 5,313,413 A | 5/1994 | Bhatia et al. |
| 5,371,753 A | 12/1994 | Adsett |
| 5,805,485 A | 9/1998 | Ito et al. |
| 5,890,098 A | 3/1999 | Kozaki et al. |

OTHER PUBLICATIONS

James W. Cooley and John W. Tukey; "An Algorithm for the Machine Calculation of Complex Fourier Series", Math of Comput., Apr. 1965, vol. 19, pp. 297–301.

Bernard J. New; "A Distributed Arithmetic Approach to Designing Scalable DSP Chips", EDN, Aug. 17, 1995, pp. 107–114.

Stanley A. White; "Applications for Distributed Arithmetic to Digital Signal Processing: A Tutorial Review", IEEE ASSP Magazine, Jul. 1989, pp. 4–19.

*Primary Examiner*—Chuong Dinh Ngo
(74) *Attorney, Agent, or Firm*—Adam H. Tachner; Crosby Heafy; Lois D. Cartier (57) ABSTRACT

A system and method are disclosed for providing highly parallel, FFT calculations in a circuit including a plurality of RADIX-2 elements. Partitioned RAM resources allow RADIXes at all stages to have optimal bandwidth memory access. Preferably more memory is made available for early RADIX stages and a "critical" stage. RADIXes within stages beyond the critical stage preferably each need only a single RAM partition, and can therefore simultaneously operate without fighting for memory resources. In a preferred configuration having P RAM partitions and P RADIX stages, the critical stage is stage number $\log_2 P$, and until the critical stage, only P/2 RADIX elements can simultaneously operate within each stage. After the critical stage, all RADIXes within each stage can simultaneously operate.

2 Claims, 6 Drawing Sheets

SYSTEM AND METHOD FOR RAM-PARTITIONING TO EXPLOIT PARALLELISM OF RADIX-2 ELEMENTS IN FPGAS

CROSS-REFERENCE TO RELATED APPLICATIONS

This is a divisional application of U.S. patent application Ser. No. 09/034,739, Verma et al., filed on Mar. 4, 1998, now U.S. Pat. No. 6,167,416 entitled "System and Method for RAM-Partitioning to Exploit Parallelism of RADIX-2 Element in FPGAs" which is a continuation-in-part of application Ser. No. 08/937,977, filed Sep. 26, 1997 U.S. Pat. No. 6,021,423, Sudip et al., issued on Feb. 1, 2000 entitled "Method for Parallel-Efficient Configuring an FPGA for Large FFTS and Other Vector Rotation Computations" which are incorporated herein by reference.

FIELD OF THE INVENTION

The present invention relates generally to the field of digital signal processing (DSP) in field programmable gate arrays (FPGAs) and more specifically to a method of computing large Fast Fourier Transforms (FFTs) using RADIX-2 elements, through efficient utilization of distributed memory resources.

BACKGROUND OF THE INVENTION

The use of FPGAs for carrying out high speed arithmetic computations has gained recognition in recent years. FPGA architectures including logic blocks having a plurality of look-up-table (LUT) function generators, such as the XC4000™ family of devices from XILINX, Inc. (the assignee of the present invention), are particularly suited for such computations. However, many of the important digital signal processing (DSP) algorithms are multiply-intensive, and even FPGAs having a large number of logic blocks and LUTs normally cannot embed the multiplier circuits and the attendant control and support circuits in a single chip. It is therefore incumbent upon the designer to choose efficient DSP algorithms and to realize them with efficient circuit designs. The Fast Fourier Transform (FFT) is an outstanding example of an efficient DSP algorithm. Distributed arithmetic (DA) is a well-established design approach for DSP implementation in FPGAs that replaces gate-consuming array multipliers with more efficient shift and add circuits offering comparable performance.

The FFT is a highly efficient procedure for computing the Discrete Fourier Transform (DFT) of a sampled time series. The DFT, taken from a continuous waveform, is derived from and closely related to the Fourier transform and is particularly useful for digital power spectrum analysis and filtering. The FFT takes advantage of the fact that the coefficients of the DFT can be calculated iteratively, which results in a considerable savings of computation time and a substantial performance advantage over the DFT.

Distributed Arithmetic (DA) was developed as an efficient computation scheme for DSP utilizing FFTs. The DA computation algorithm is now being effectively applied to embed DSP functions in FPGAs, particularly those with coarse-grained look-up table architectures, as described in U.S. Pat. No. 6,021,423. DA enables the replacement of the array multiplier, central to many DSP applications, with a gate-efficient serial/parallel multiplier, with little or no reduction in speed.

U.S. Pat. No. 6,021,423 discloses a space-efficient DA implementation of a DSP circuit implemented in an FPGA using FFTs. In the disclosed circuit, time-invariant systems are implemented using a 16-word, SCRAM-based DA look-up table (DALUT). The DALUT contains the pre-computed values of all possible sums of coefficients, weighted by binary values of serial input data. Additional RAM resources are required for the large sine/cosine basis function database. These memory requirements are accommodated using a DALUT containing the pre-computed sums of partial products for combinations of input variables $X_{rm}$, $X_{im}$, $X_{rn}$, $X_{in}$ and $\theta_k$, as illustrated in FIG. 1.

Figure 1:
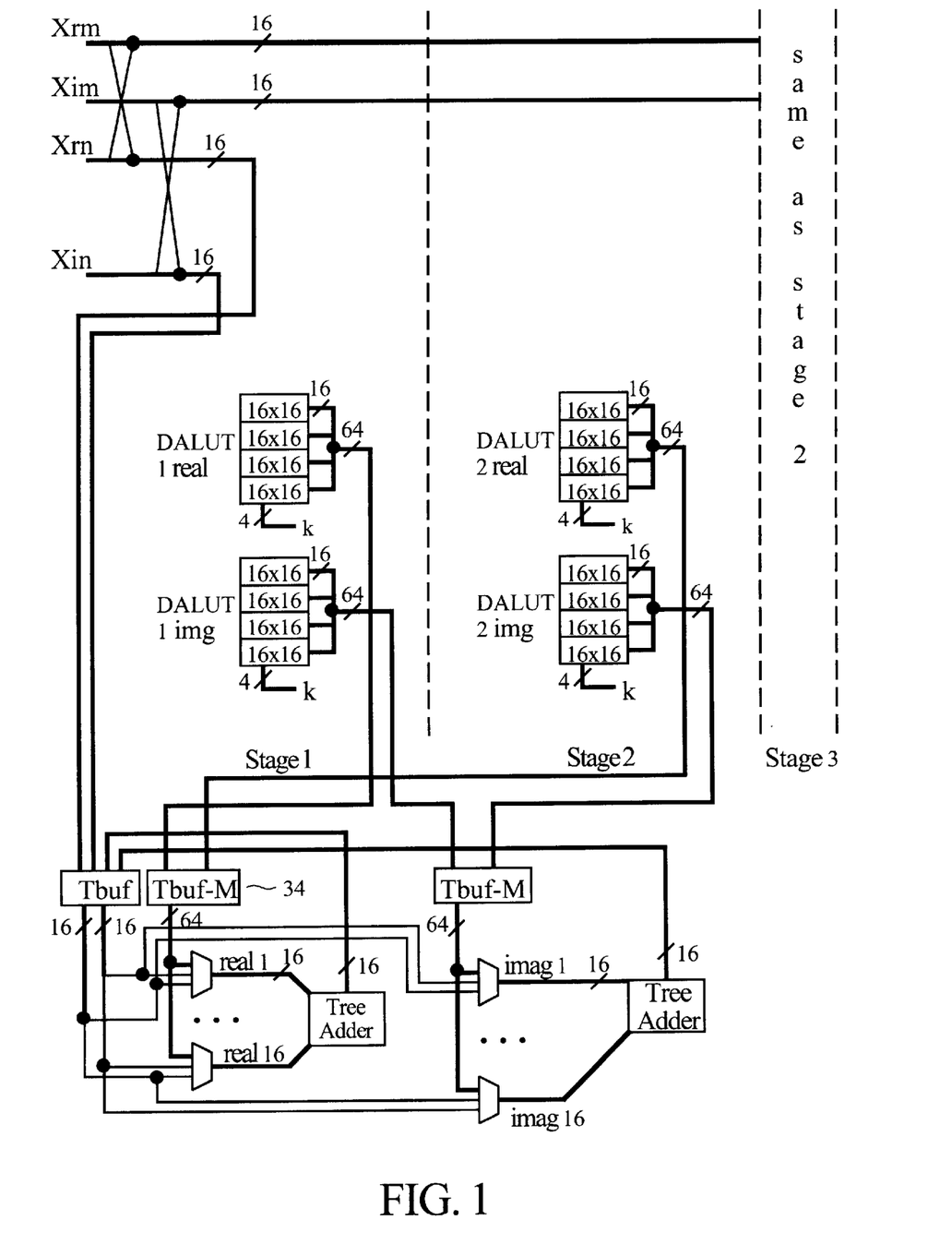
FIG. 1 is an FFT computation flow diagram first disclosed in U.S. Pat. No. 6,021,423.

The highly space-efficient implementation of a RADIX-2 circuit, illustrated in FIG. 1 and described in U.S. Pat. No. 6,021,423, allows for the implementation of complex FFT circuitry in a single programmable logic device. While the implementation disclosed in the parent case provides a number of significant advantages over the prior art, there remains a need to increase the speed of circuits that benefit from the use of a plurality of RADIX-2 implementations.

The need for multiple RADIXes is apparent from a time series containing $N=2^s$ samples or "points" (where s is the number of stages), wherein the corresponding FFT entails 2 sN=2Nlog$_2$N multiply operations. For a complete N=1024 point FFT operation on 1024 time-points, a total of 5120=(N/2*log$_2$N=512* 10) RADIX-2 operations will be required. If only one RADIX-2 is used, since two cycles are required for each RADIX-2 operation, the total time required will be 10240 (5120* 2) cycles.

To reduce the number of cycles required for FFT calculations, it appears one need only increase the number of RADIX-2 elements in the circuit and use them simultaneously in each stage. However, two cycles (assuming dual-port RAM is used) are also needed to read and write variables to and from memory, and RAM read and write operations are required for every FFT function, even if additional RADIXes are used. Thus, where only a single RAM is available, there is little, if any, gain in implementation speed from the use of more than one RADIX-2 in a stage. A bottleneck in the data-rate from and to the RAM will retard the function of the circuit. Thus, using k RADIXes in a particular stage does not necessarily provide for k-times speedup of FFT calculations over a single-RADIX implementation. There is therefore a need in the art to which the present invention pertains to optimize FFT implementation for simultaneous use of a plurality of RADIXes.

SUMMARY OF THE INVENTION

To address the shortcomings of the available art, the present invention provides a method and system for partitioning RAM resources in such a manner as to optimize memory access bandwidth in a multi RADIX-2 system for FFT calculation. This enables system speed to increase in nearly direct proportion to the increase in processing speed provided by the addition of a plurality of RADIXes to the circuit. In a preferred embodiment, a plurality of memory partitions are provided for RADIXes at early stages in the circuit up to, but not including, a critical stage (pre-critical stages), while only a single RAM partition is required for each RADIX-2 in stages at and beyond the critical stage. In the preferred embodiment, a plurality of memory partitions are accessed by p/2 RADIXes in pre-critical stages of the circuit, while only a single RAM partition is accessed by all of the p RADIXes in stages at and beyond the critical stage. Multiplexing resources are preferably structured to reflect the RAM partition and RADIX interaction for each stage.

It is therefore a first advantage of the present invention to provide a method and system for designing a circuit for providing efficient simultaneous operation of a plurality of RADIX-2 elements to enable a Fast Fourier Transform (FFT) calculation, the circuit being implemented in a logic device including programmable resources for implementing the circuit, the method comprising the steps of (and the system comprising means for) assigning a plurality of memory resources, each. designated $R_{vw}$, to a plurality of RADIX-2 elements, each designated $X_{ab}$, assigning a first multiplexing means to selectively forward data to at least one of the RADIX-2 elements from at least one of the plurality of memory resources, assigning a second multiplexing means to selectively forward data from at least one of the RADIX-2 elements to at least one of the plurality of memory resources, whereby a RADIX-2 $X_{ab}$ receives data from memory resources $R_{vw}$ such that (vw=ab) or vw can be derived by changing either a or b from 0 to 1, and a memory resource $R_{vw}$ receives data from a RADIX-2 $X_{ab}$ whose ab is such that (ab=vw) or ab can be derived by changing either v or w from 1 to 0.

It is a further advantage of the present invention to provide a method and system for designing a circuit for providing efficient simultaneous operation of a plurality of RADIX-2 elements, the circuit being implemented in a logic device including programmable resources for implementing the circuit, the circuit processing N time samples at P RADIX-2 elements within S stages, the method comprising the steps of selecting N, P, and S for implementation of the circuit in a first pre-selected programmable logic device, the selection of N, P, and S designating a total area required for the circuit implementation, calculating a calculation time required to perform calculations within the circuit having N samples, P elements and S stages, and modifying either of N, P:, and S to change either of the total area required and the calculation time of the circuit implementation. This method can be further characterized where P/2 elements are utilized at stages zero through [$\log_2 P-1$] and P elements are utilized at stages $\log_2 P$ through S.

A still additional advantage of the present invention is the provision in an integrated circuit device comprising a memory resource and a plurality of RADIX-2 stages, each one of the stages including a plurality of RADIX-2 elements, of a method and system for efficient simultaneous operation of the plurality of RADIX-2 elements to enable a Fast Fourier Transform (FFT) calculation, the method comprising the steps of dividing the memory resource into a plurality "P" of memory partitions, designating a selected stage as a critical stage, assigning at least two of the memory partitions to each of the plurality of RADIX-2 elements within a first stage, and repeating the assigning step for each stage up to but not including the critical stage, assigning a single memory partition to each of the plurality of RADIX-2 elements within the critical stage, the RADIX-2 elements within the pre-critical stages each accessing the at least two of the memory partitions, thereby providing efficient, simultaneous operation of the plurality of RADIX-2 elements This method can be further characterized wherein each said stage has a position, and the position of the critical stage equals $\log_2 P$. This method can be further characterized as having P/2 RADIX-2 elements contained within the first stage and each said pre-critical stage up to but not including the critical stage.

BRIEF DESCRIPTION OF THE DRAWINGS

The aforementioned advantages of the present invention as well as additional advantages thereof will be more clearly understood hereinafter as a result of a detailed description of a preferred embodiment of the invention when taken in conjunction with the following drawings.

DETAILED DESCRIPTION OF A PREFERRED EMBODIMENT

Figure 2:
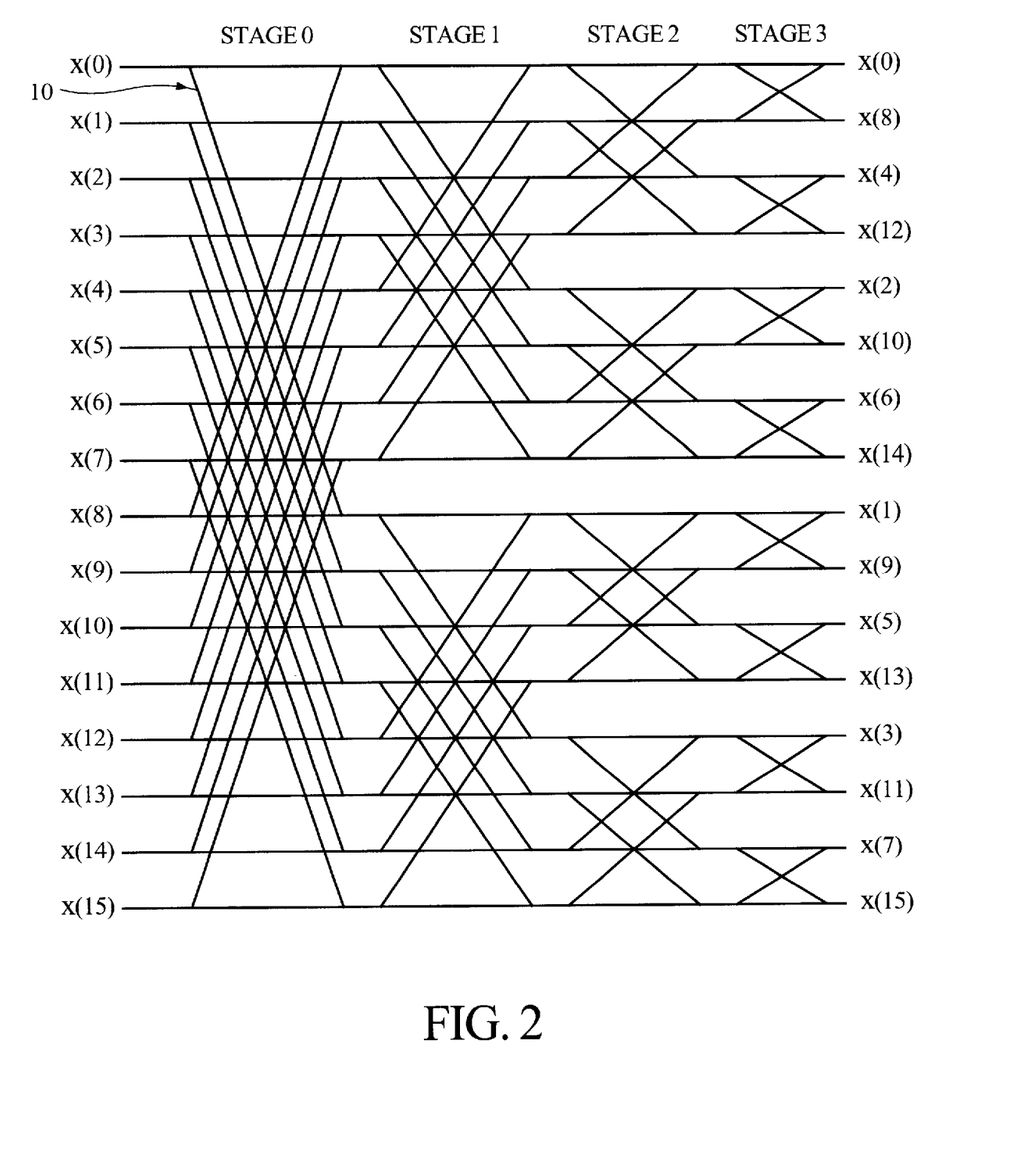
FIG. 2 abstractly illustrates a four-stage, multi-RADIX, DA circuit and the access to memory resources required for each of the RADIXes in the circuit.

An s-stage, 16-point RADIX-2 based FFT structure is illustrated in FIG. 2 (where s=4), wherein each column represents a calculation stage and each crossed-line pair 10 (eight in each column) represents a RADIX-2 for calculating a two-point FFT. We know from observing the illustrated structure that the more advanced the stage, the smaller the memory which interacts with the RADIXes within the stage. Also, for a particular partitioning of the available RAM, there exists a critical stage ("cstage" at position $S_{cstage}$) at and beyond which p RADIX-2 structures within every stage can operate simultaneously (i.e., data is never required from multiple memory partitions by a single RADIX-2 operation). The critical stage and p are directly related in that $p=2^{(cstage)}$. Until the critical stage, only p/2 RADIXes can operate in a parallel fashion.

Figure 3A:
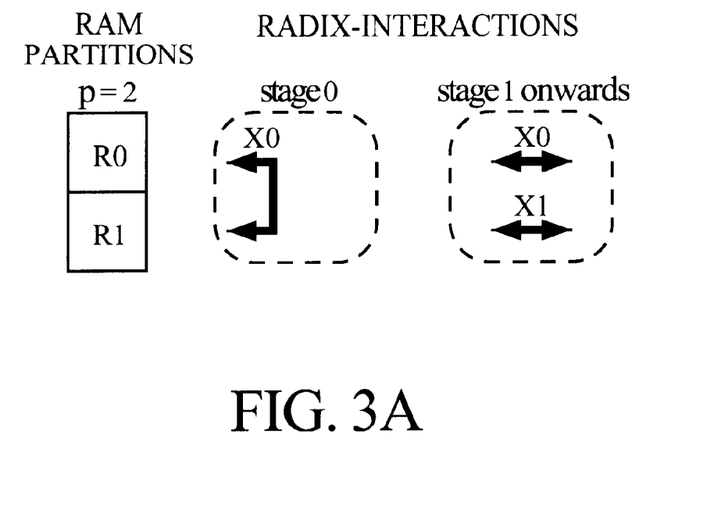
FIGS. 3A, 3B and 3C illustrate the interactions of RAM partitions and RADIX-2 implementations in a two-partition, a four-partition, and an eight-partition implementation, respectively, of a 16-point FFT utilizing the method and system of the present invention.
Figure 3B:
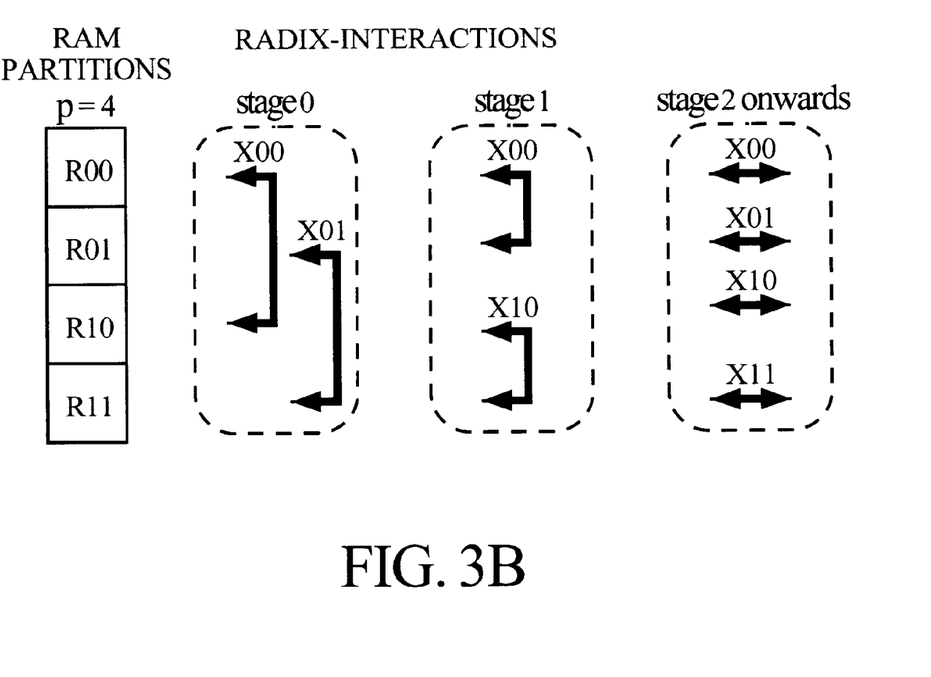
Figure 3C:
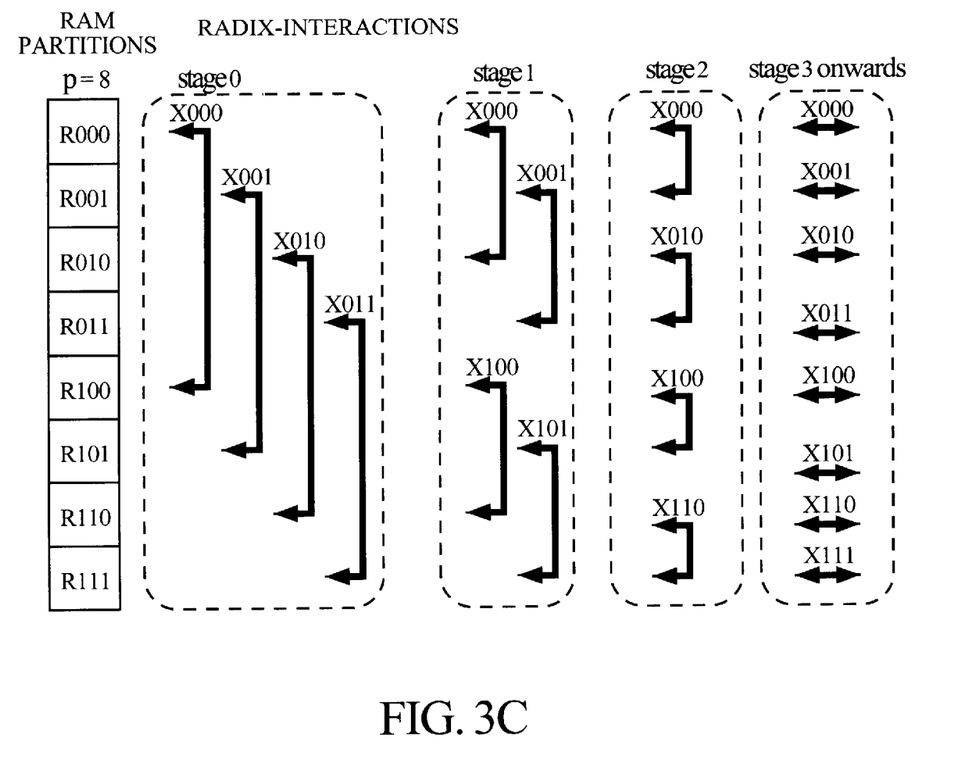

The RAM-RADIX interactions of the present invention can be better understood with reference to FIGS. 3A–3C, illustrating the cases of p (representing both the number of RADIXes within each stage and the number of RAM partitions interacting with each stage) equals two (FIG. 3A), four (FIG. 3B), and eight (FIG. 3C). Preferably, for ease of RAM access, only RADIXes with their kth bits at 0 are used, thereby utilizing only p/2 RADIXes, in the pre-critical stages. Also, any RADIX labeled as $X_{abc}$, for example, preferably interacts with partition $R_{abc}$ and all other RAM-partitions that can be addressed by changing any one of the sub-indices a, b, or c from 0 to 1. So, RADIX $X_{000}$ in FIG. 3C interacts with RAM partitions $R_{000}$ and $R_{100}$ (in stage 0), $R_{010}$ (in stage 1), $R_{001}$ (in stage 2), and $R_{000}$ alone(in stages 3 and beyond).

The RAM-partition interfaces with the RADIXes can be similarly structured. In the preferred embodiment of the present invention, two multiplexer (MUX) elements are needed, one for reading from the RAM and another for writing to the RAM. Preferably, dual-port RAM is utilized to minimize read and write delays. The input-size of a MUX varies from 1 to (b+1), where $b=\log_2 p$. The average MUX input-size is therefore (1+[b/2]).

Figure 4:
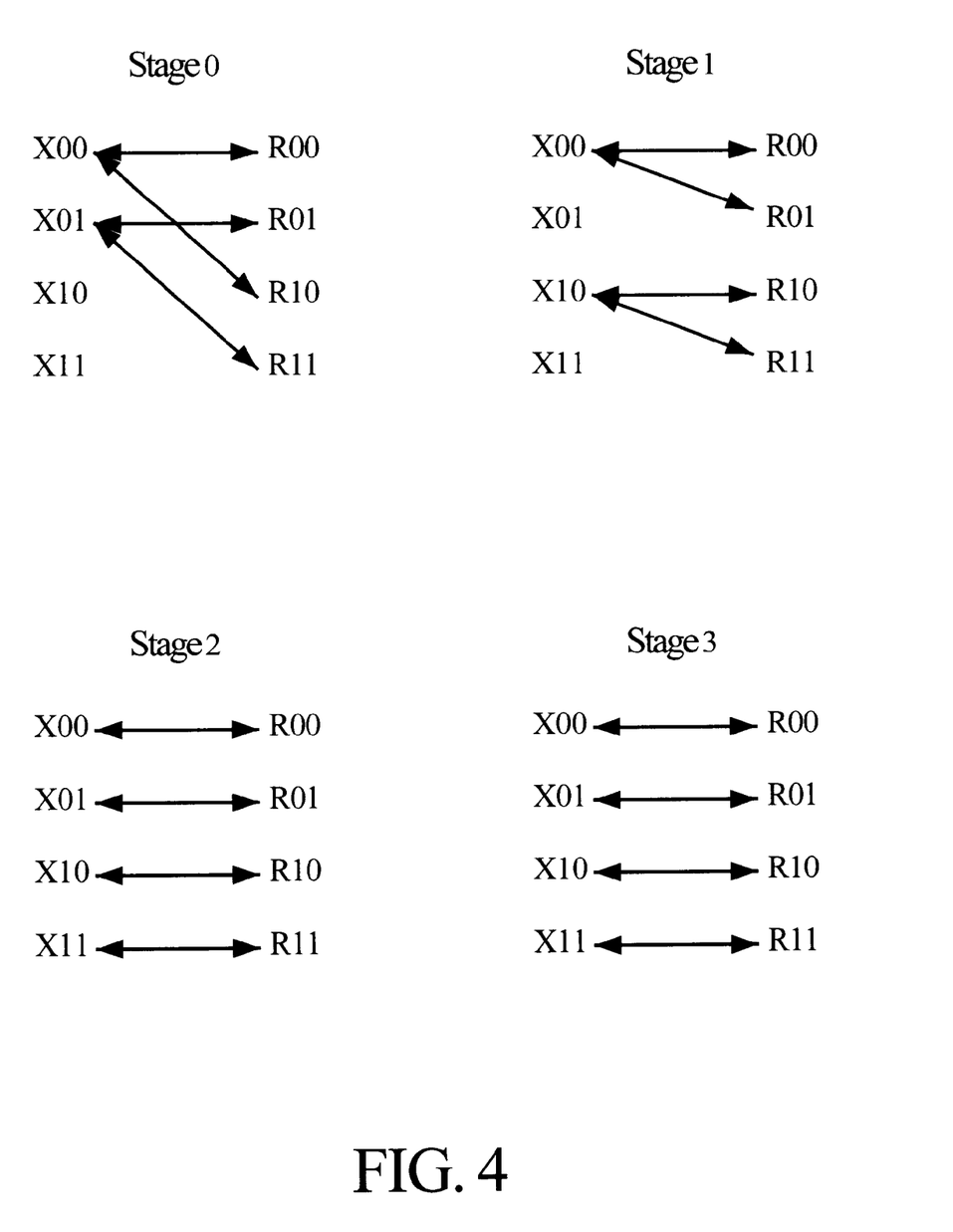
FIG. 4 illustrates the relationship between FFTs and RAM partitions in a preferred embodiment of the present invention.

For example, if p=4 and N=16, as illustrated in FIGS. 2 and 3B, we have four RADIXes labeled $X_{00}$, $X_{01}$, $X_{10}$, $X_{11}$, and four RAM-partitions, $R_{00}$, $R_{01}$, $R_{10}$, $R_{11}$. The preferred RADIX/RAM interaction is provided below for each of the four stages, and is illustrated in FIG. 4.

Figure 5:
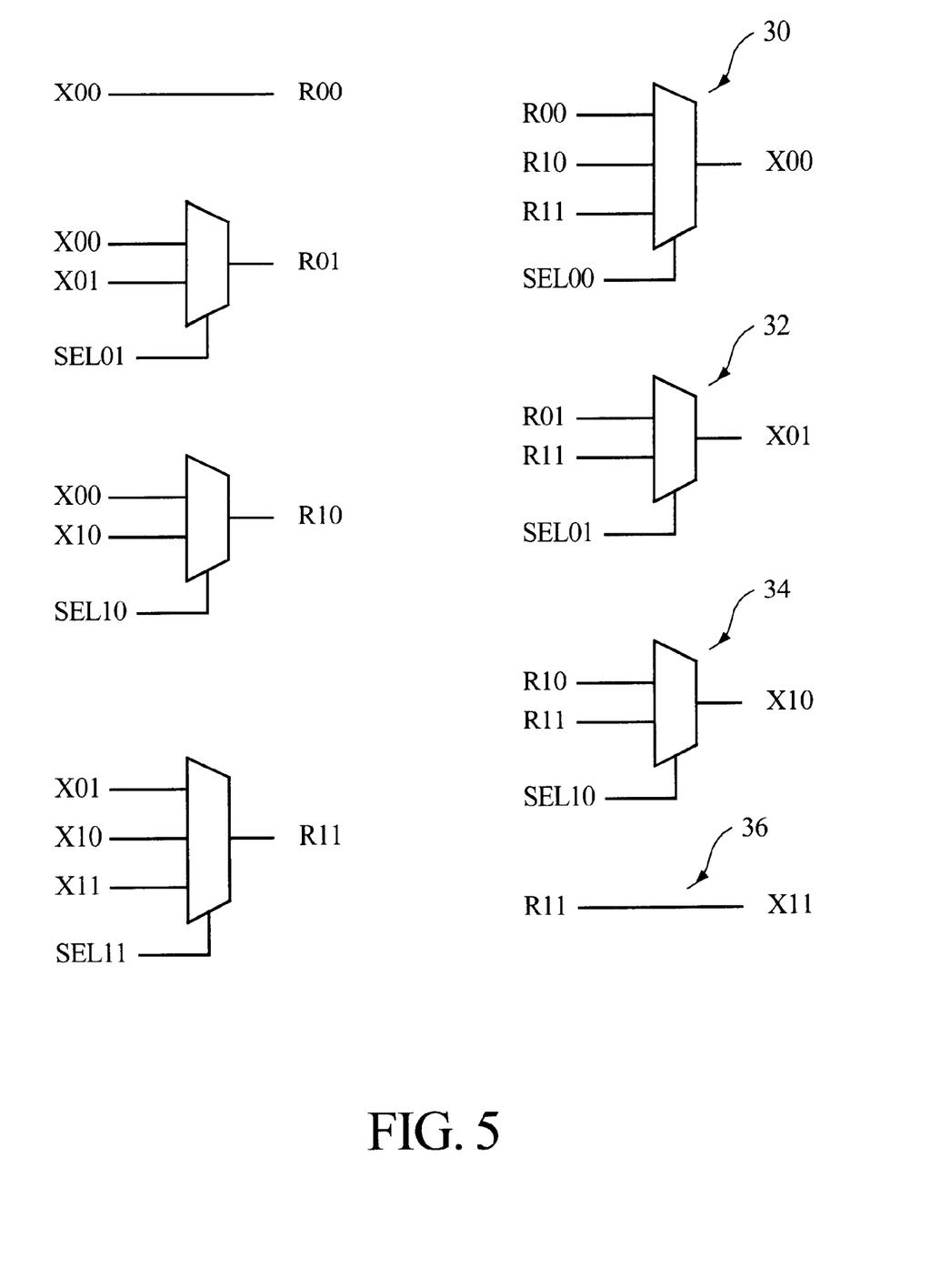
FIG. 5 illustrates a preferred relationship between multiplexers (MUXes) and RAM partitions in the present invention.

Stage 00: RADIXes used: $X_{00}$ and $X_{01}$ (those with 1st bit 0) Interaction: $X_{00}\leftrightarrows(R_{00}, R_{10})$ $X_{01}\leftrightarrows(R_{01}, R_{11})$ Stage 01: RADIXes used: $X_{00}$ and $X_{10}$ (those with 2nd bit 0) Interaction: $X_{00}\leftrightarrows(R_{00}, R_{01})$ $X_{10}\leftrightarrows(R_{10}, R_{11})$ Stage 10: RADIXes used: $X_{00}$ $X_{01}$, $X_{10}$, $X_{11}$ (all four)
Interaction: $X_{00} \leftrightarrows R_{00}$ $X_{01} \leftrightarrows R_{01}$ $X_{10} \leftrightarrows R_{10}$ $X_{11} \leftrightarrows R_{11}$ Stage 11: RADIXes used: $X_{00}$, $X_{01}$, $X_{10}$, $X_{11}$ (all four)
Interaction: $X_{00} \leftrightarrows R_{00}$ $X_{01} \leftrightarrows R_{01}$ $X_{10} \leftrightarrows R_{10}$ $X_{11} \leftrightarrows R_{11}$ A preferred embodiment of the present invention therefore requires multiplexing data between the RADIXes and RAM partitions. For the case illustrated in FIG. 4, the MUX settings for reading and writing to and from the RAM partitions is illustrated in FIG. 5. Looking first at the right hand column of FIG. 5, to read, we have ($[R_{00}\ R_{01}\ R_{10}] \rightarrow X_{00}$ at MUX setting 30, $[R_{01}\ R_{11}] \rightarrow X_{01}$ at MUX setting 32, $[R_{10}\ R_{11}] \rightarrow X_{10}$ at MUX setting 34, and $R_{11} \rightarrow X_{11}$ at MUX setting 36). Thus, we can see that an $X_{ab}$ element gets data from those $R_{vw}$ elements whose vw are such that (vw=ab) or vw can be derived by changing either a or b from 0 to 1. The MUXing required to write into the RAM partition is similarly given by ($X_{00} \rightarrow R_{00}$, $[X_{00}\ X_{01}] \rightarrow R_{01}$, $[X_{00}\ X_{10}] \rightarrow R_{10}$, $[X_{01}\ X_{10}\ X_{11}] \rightarrow R_{11}$), as illustrated in the left column of FIG. 5. In this case, an $R_{vw}$ gets date from those $X_{ab}$ whose ab are such that (ab=vw) or ab can be derived by changing either v or w from 1 to 0. The addresses within each accessed RAM are generated by a counter (not shown, having only two bits in the example of FIG. 5).

Next, we can calculate the area and speed advantages provided by the preferred embodiment of the present invention, wherein the parallel, DALUT-based implementation of U.S. Pat. No. 6,021,423 is used within each RADIX-2. Also, we assume an N-point FFT where the data is b bits-wide and the sine-cos values (of $\theta_k$) are c bits-wide. The DALUT addressing is accomplished with $k=\log_2(N/2)$ bits. Further, we assume p partitions, i.e., there are p RADIXes available for any stage, and p RAM partitions preferably, but not necessarily, contained within a single block RAM. The number of stages to perform the N point FFT is $S=\log_2 N$.

First we consider increased speed. We will be able to use (p/2) RADIXes for $\log_2(p)$ stages and p RADIXes for the rest of the stages, beginning with the critical stage. Thus, the total number of cycles required will be $[(N/p * \log_2 p + N/2p * [s - \log_2 p]) * 2]$.

Next, we consider the area required for the implementation of the circuit of the present invention in an FPGA. In the parent application, it was shown that (cd+d/4+bc+(b−1)c+2b)=f Configurable Logic Blocks (CLBs) are required to implement a single, parallel RADIX-2, FFT implementation. For p RADIXes, therefore, the total number of CLBs required will be (p)*(f).

Thus, the speed vs. area trade-off for p RADIXes, representing the optimal performance ratio that can be achieved using p RADIX-2 FFTs, is given by $$\frac{([N/p * (\log_2 p) + (N/2p) * (s - \log_2 p)] * 2)}{(p * [ck + (k/4) + bc + (b-1) * c + 2b]}$$

The speed and area performance levels for an 8192-point and 1024-point RADIX implementation are provided in Tables 1 and 2, respectively, illustrating the trade-off that the user can engage in when designing a highly parallel RADIX-2 FFT implementation using the present

TABLE 1

| 8192-Point RADIX No. of RADIXes Avail. per stage | Area = No. of CLBS (Rel. Size in Parens.) | Total No. of Cycles (Relative Speed in Parens.) |
|---|---|---|
| 1 | 723 (1X) | 106496 (1F) |
| 2 | 1446 (2X) | 57344 (1.9F) |

TABLE 1-continued

| 8192-Point RADIX No. of RADIXes Avail. per stage | Area = No. of CLBS (Rel. Size in Parens.) | Total No. of Cycles (Relative Speed in Parens.) |
|---|---|---|
| 4 | 2892 (4X) | 30720 (3.5F) |
| 8 | 5784 (8X) | 16384 (6.5F) |

TABLE 2

| 1024-Point RADIX No. of RADIXes Avail. per stage | Area = No. of CLBS (Rel. Size in Parens.) | Total No. of Cycles (Relative Freq. in Parens.) |
|---|---|---|
| 1 | 620 (1X) | 10240 (1F) |
| 2 | 1280 (2X) | 5632 (1.8F) |
| 4 | 2560 (4X) | 3072 (3.3F) |
| 8 | 5120 (8X) | 1664 (6.2F) |

The present invention therefore comprises a novel method and system for utilizing multiple RADIX-2 elements using partitioned RAM resources. Where, as in most FPGAs, on-chip RAMs are distributed, there is no performance penalty for using partitioned RAM instead of single block RAM with the present invention, although either approach or any equivalent is envisioned. The inventive approach provides a mechanism for efficiently exploiting the area-performance trade-off available through FFTs. Using the inventive method and system, one can generate an FFT calculation circuit to suit the a broad range of area and speed requirements, even where multiple RADIX-2s are required.

It will be understood that the disclosed embodiments are of an exemplary nature and that the inventive method and system are conducive to even larger and more complex computations not explicitly disclosed herein. Accordingly, the present invention is to be limited only by the appended claims and their equivalents.

What is claimed is:

1. A method of designing a circuit for providing efficient simultaneous operation of a plurality of RADIX-2 elements to enable a Fast Fourier Transform (FFT) calculation, the circuit being implemented in a logic device including programmable resources for implementing the circuit, the method comprising the steps of:

assigning a plurality of memory resources, each designated $R_{vw}$, to a plurality of RADIX-2 elements, each designated $X_{ab}$;

assigning a first multiplexing means to selectively forward data to at least one of said RADIX-2 elements from at least one of said plurality of memory resources; and assigning a second multiplexing means to selectively forward data from at least one of said RADIX-2 elements to at least one of said plurality of memory resources;

whereby a RADIX-2 element $X_{ab}$ receives data from memory resources $R_{vw}$ such that (vw=ab) or vw can be derived by changing either a or b from 0 to 1, and a memory resource $R_{vw}$ receives data from a RADIX-2 element $X_{ab}$ whose ab is such that (ab=vw) or ab can be derived by changing either v or w from 1 to 0.

2. A system for designing a circuit for providing efficient simultaneous operation of a plurality of RADIX-2 elements to enable a Fast Fourier Transform (FFT) calculation, the circuit being implemented in a logic device including programmable resources for implementing the circuit, the system comprising:

means for assigning a plurality of memory resources, each designated $R_{vw}$, to the plurality of RADIX-2 elements, each designated $X_{ab}$;

means for assigning a first multiplexing means to selectively forward data to at least one of said RADIX-2 elements from at least one of said plurality of memory resources; and means for assigning a second multiplexing means to selectively forward data from at least one of said RADIX-2 elements to at least one of said plurality of memory resources;

whereby a RADIX-2 element $X_{ab}$ receives data from memory resources $R_{vw}$ such that (vw=ab) or vw can be derived by changing either a or b from 0 to 1, and a memory resource $R_{vw}$ receives data from a RADIX-2 element $X_{ab}$ whose ab is such that (ab=vw) or ab can be derived by changing either v or w from 1 to 0.

* * * * *